United States Patent [19]

Gulden

[11] 3,996,025

[45] Dec. 7, 1976

[54] APPARATUS FOR DISTRIBUTING FLOWING MEDIA FROM ONE FLOW CROSS SECTION TO A FLOW SECTION DIFFERENT THEREFROM

[75] Inventor: Peter Gulden, Erlangen, Germany

[73] Assignee: Siemens Aktiengesellschaft, Munich, Germany

[22] Filed: Aug. 6, 1975

[21] Appl. No.: 602,422

[30] Foreign Application Priority Data

Aug. 14, 1974 Germany .......................... 2439144

[52] U.S. Cl. .............................. 48/107; 23/252 R; 23/281; 23/288 R; 138/39; 239/553.3
[51] Int. Cl.² ........................ B01J 8/02; B05B 1/14; C10G 9/04; F15D 1/02
[58] Field of Search .................. 23/281, 288 R, 284, 23/252 R, 252 US, 289 US; 48/93, 107, 180 B, 180 C, 192 US, 212 US; 239/553.3, 553.5; 138/37, 39

[56] References Cited

UNITED STATES PATENTS

| | | | |
|---|---|---|---|
| 2,343,560 | 3/1944 | Klein et al. ......................... | 138/37 |
| 2,701,185 | 2/1955 | Evans ................................. | 23/284 |
| 2,876,079 | 3/1959 | Upchurch et al. .................. | 23/284 |
| 3,871,838 | 3/1975 | Henkel et al. ...................... | 48/107 |

FOREIGN PATENTS OR APPLICATIONS

| | | | |
|---|---|---|---|
| 1,030,252 | 3/1953 | France ........................... | 23/288 R |

Primary Examiner—Joseph Scovronek
Attorney, Agent, or Firm—Kenyon & Kenyon Reilly Carr & Chapin

[57] ABSTRACT

Apparatus for distributing flowing media from one flow cross section to a different flow cross section in a funnel-shaped tubular enclosure open at both ends. A plate having a multiplicity of parallel passage canals is arranged perpendicular to the axis of the tubular enclosure leaving free passage openings between the edge of the plate and the tubular enclosure and the flared opening of the funnel shaped tubular enclosure is filled by an end plate with a multiplicity of parallel passage canals.

8 Claims, 1 Drawing Figure

U.S. Patent  Dec. 7, 1976  3,996,025
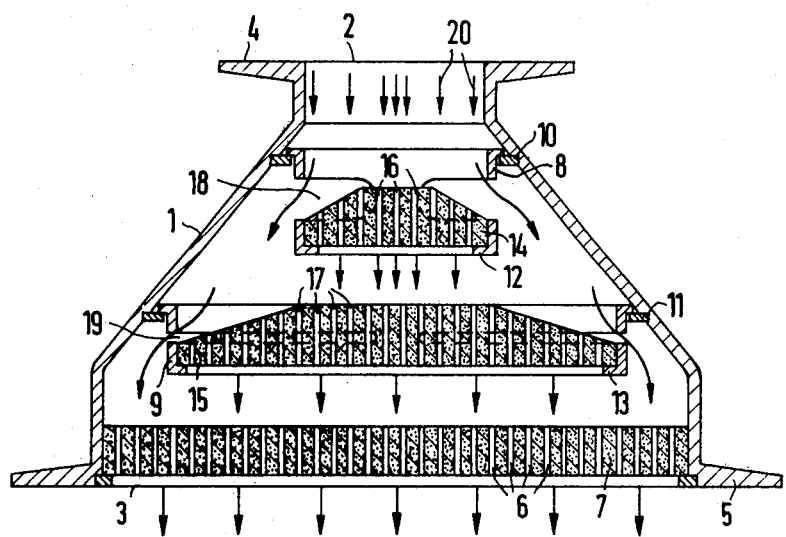

APPARATUS FOR DISTRIBUTING FLOWING MEDIA FROM ONE FLOW CROSS SECTION TO A FLOW SECTION DIFFERENT THEREFROM

BACKGROUND OF THE INVENTION

The invention relates to apparatus for distributing flowing media (gases or liquids) from one flow cross section to a different flow cross section in general and more particularly to an improved apparatus of this nature.

Such apparatus is required, for instance, in an installation for chemical processes in which the cross section of a feed line carrying a flowing, gaseous or liquid medium must be adapted to the cross section of a succeeding part of the installation in such a manner that the flowing medium is distributed over the cross section of the succeeding part of the installation in a defined manner, e.g., uniformly. There is a particular need for such a device in a cylindrical chamber filled with a catalyst which must be charged with a mixture of gaseous reactants coming from a smaller feed line in such a way that the catalyst is loaded uniformly. Other possible applications include the uniform spraying of fillings with liquids or the aerating of liquids with gases in appropriate installations.

In a pipe flared out in funnel shape which has an aperture angle of less than 6° to 8° (measured between the central axis of the pipe and a straight line on the surface of the funnel), a laminar flow is still able to follow the flare of the pipe without development of stagnant spaces and turbulence. Thus, it is possible to obtain a flow of the medium different from zero over the entire cross section through the use of long, slowly tapered transition sections whose aperture angles are correspondingly small between the different cross sections of an installation. However, such arrangements, in addition to having an undesirably large structural length, have a media flow profile of the type calculated by Hagen and Poiseuille with a flow density which drops off toward the wall.

SUMMARY OF THE INVENTION

It is an object of the present invention to distribute a medium flowing from a feed line as uniformly as possible over a cross section which is different from the cross section of the feed line.

According to the present ivnention, this object is achieved in apparatus of the type mentioned at the outset by a tubular enclosure flared out in funnel fashion and open at both ends having at least one plate having a multiplicity of parallel passage canals which is mounted in the tubular enclosure perpendicular to the axis of the tubular enclosure and leaves passage openings between the rim of the plate and the tubular enclosure with an end plate having a multiplicity of parallel passage canals filling the flared opening of the tubular enclosure.

The funnel shape of the tubular enclosure prevents the development of dead spaces. The passage openings on the side present a lower flow resistance to the media flowing through the apparatus than the passage canals and thereby bring about sufficient flow velocity in the vicinity of the wall of the tubular enclosure even at low flow rates.

In a preferred embodiment of the present invention several plates with lateral openings between the rim of the plate and the tubular enclosure are arranged one behind the other in the direction of the axis of the tubular enclosure with mutual spacing in order to amplify the distributor effect.

In this connection it is advantageous for the base areas of plates which follow each other in the direction of the flare of the tubular enclosure to increase in order to ensure that the flow of the media follows the change of the cross section of the tubular enclosure even with short tubular enclosures or very large aperture angles.

It is particularly advantageous for the plates to be shaped so that the thickness of at least one plate decreases toward the rim of the plate. A medium flowing from a feed pipe thus encounters longer passage canals which have a higher flow resistance in the region of the accelerated core flow which streams out of the center of the feed pipe and therefore slow down the core flow and partially deflect it toward the rim.

In one embodiment of the apparatus of the present invention the sum of the areas of the passage openings between the rim of the plate and the tubular enclosure is smaller for each plate than the cross section area of the smaller opening of the tubular enclosure.

In another embodiment with two plates following each other in the direction of the flare of the tubular enclosure, the sum of the areas of the passage openings between the rim of the plate and the tubular enclosure is smaller for the following plate than for the preceding plate. This insures that a sufficient portion of the flow of medium always flows through the parallel passage openings.

The individual plates are preferably fastened in tube sections which can be inserted into the tubular enclosure with the passage openings between the rim of the plate and the tubular enclosure formed by slots in the walls of the tube sections.

Such apparatus is particularly well suited as a distributor for a mixture of gases that are to be reacted with each other and which is to be fed from a small feed line into a reaction chamber of larger cross section which is filled with a catalyst. The smaller opening of the tubular enclosure is the entrance opening for the gas mixture which after passage through the device leaves through the end plate in the wider opening of the tubular enclosure uniformly distributed. This insures that the catalyst in the reaction chamber is uniformly loaded. The end plate can serve at the same time as the boundary of the reaction chamber on the inlet side and for protection against backfiring to prevent uncontrolled firing of the reactive gas mixture in the present apparatus due to the reaction taking place in the chamber.

The apparatus according to the present invention can also be used to advantage as a collector for a medium which comes from a pipe of larger cross section and is fed into a pipe of smaller cross section. The wider opening filled by the end plate of the tubular enclosure becomes the inlet opening of the flow of medium and the opening at the narrower end the outlet opening. In order to permit a mixture of reacting gases, for instance, to flow uniformly through a reaction chamber filled with a catalyst and to remove the reaction products in a smaller suction line, a reaction chamber may be followed by a device according to the invention used as a collector. The apparatus of the present invention so used as a collector causes the suction of the smaller suction line to be distributed evenly over the larger outlet cross section of the reaction chamber.

BRIEF DESCRIPTION OF THE DRAWINGS

The single figure is a longitudinal cross section through a typical embodiment of the apparatus according to the present invention.

DETAILED DESCRIPTION OF THE PREFERRED EMBODIMENT

The figure illustrates a device according to the present invention in cross section.

The outer case of the device consists of a tubular enclosure 1 which is flared in funnel fashion and is open on both sides. Enclosure 1 has flanges 4 and 5, respectively, at its smaller opening 2 and its wider opening 3. The wider opening 3 is filled with an end plate 7 designed as a perforated sintered block with many parallel passage canals 6. Two coaxial inserts are mounted in the tubular enclosure. These inserts consist, respectively, of sections of tube 8 and 9 fastened to the tubular enclosure at one end by means of snap rings, 10 and 11 respectively. At its other end each has a projection 12 and 13, respectively, which extends into the tube section. Resting on these projections are plates 14 and 15 each containing a multiplicity of parallel canals, 16 and 17 respectively. As illustrated plates 14 and 15 have bevelled sides. These plates are, for instance, perforated sintered blocks of aluminum oxide or magnesium oxide. Slots 18 and 19 to provide lateral passage openings which run prallel to the rims of the plates are also formed in the tube sections.

The cross sectional areas of the lateral openings 18 and 19 of each insert are made so that the sum of their areas decreases in the direction of the flare of the tubular enclosure, i.e., the area of openings 19 is less than that of openings 18. The total area is always smaller than the cross sectional area of the smaller opening 2 of the tubular enclosure.

To clarify the operation, flow lines 20 are shown in the figure for a medium flowing in the direction of the flare of the tubular enclosure. The flow of medium issuing from a smaller feed line with a parabolic velocity profile encounters locally different flow resistances in the device. A throttling effect is brought about at each insert, which is accompanied by an increase in the flow velocity and leads to turbulence behind the inserts, particularly behind the lateral passage openings.

At a low flow rate, the flow is largely laminar. The passage canals, which become shorter toward the rim within a plate due to the bevelled sides, constitute a flow resistance which decreases toward the rim of the plate. The flow resistance of the lateral passage openings is low in comparison and is determined largely by the turbulence. This brings about an equalization of the parabolic velocity profile. At higher flow rates, the throttling effect and the development of turbulence increase and the resistance of the passage canals is determined largely by the flow conditions at the input. The interaction of these influences also brings about a good distribution at higher flow rates. The distributor effect is therefore largely independent of the magnitude of the flow rate.

In the example shown in the figure, the inside diameter of the tubular enclosure 1 increases over a length of about 70 mm from about 32 mm to about 105 mm. The plates 14, 15 and 7, made as perforated sintered blocks of magnesium oxide, have circular base areas with diameters of 32 mm, 85 mm and 105 mm, respectively, and a thickness of about 10 mm. The lateral passage openings in the inserts are about 6.3 mm wide in the tube section 8 and about 1 mm wide in the tube section 9. The passage canals have a diameter of 1 mm and an area density of about 45 canals per $cm^2$ of plate surface. The spaces between the plates 14 and 15 and between 15 and 7 are about 12 mm.

To explain the advantages of a device according to the present invention, assume that a mixture of colder, reactive gasses issuing from a smaller feed line is fed through a simple, funnel shaped transistion tube to a chamber of larger input cross section where a reaction is carried out at a catalyst with reaction heat maintaning an elevated temperature. There would be danger that the main part of the gas issuing from the feed line, in the form of a core flow, would pass only through a small area of the catalyst volume in the vicinity of the central axis of the catalytic chamber. With the catalyst remaining cold in other regions due to a lack of sufficient gas throughput, the colder gases could cool down the catalyst in the area of the core flow ("cold-blowing") and the ability of the catalyst to convert might thereby be exceeded. The result would be incomplete conversion, possibily accompanied by the appearance of interfering solid residues.

In contrast thereto, the apparatus according to the invention distributes the gas stream evenly over the entire chamber cross section. In addition, no dead spaces occur in the device. Such spaces would favor the precipitation of impurities and, as stationary reaction chambers, backfiring of the reaction. The plates also act as heat shields to prevent excessive heating of the gases inside the device through heat radiation from the hot catalyst.

Installations for the catalytic generation of reformed (cracked) gas can use the device of the present invention to great advantage. In such installations evaporated fuels free of harmful substances, such as lead-free gasoline with a low octane number mixed with oxygen containing gases such as air or exhaust gas are converted to form fuel gas (reformed gas) of excellent combustion properties, e.g., for supplying internal combustion engines. The conversion takes place in reaction chambers with suitable catalysts, known as reformed-gas generators, such as are described in U.S. Pat. No. 3,828,736 and U.S. patent application Ser. No. 440,023 now U.S. Pat. No. 3,915,125, issued Oct. 28, 1975. For this application, aluminum oxide and magnesium oxide are particularly suited as the plate materials in the present device since undesired secondary reactions are very largely avoided with them. However, plates of other materials, e.g., of metal, can also be used, particularly for other applications.

When the reaction products leave the reaction chamber, a similar distribution problem arises. If the gas transport is effected, for instance, in an application to motor vehicles, by the suction of an internal combustion engine following the reformed gas generator, then the suction of the smaller suction line leading to the internal combustion engine must be distributed over the larger cross section of the reaction chamber in order to prevent constriction of the gas stream in the chamber prior to entering the suction line. This can be achieved advantageously by placing a device according to the present invention between the reaction chamber and the suction line to act as a collector.

The apparatus according to the invention is not limited to circular cross sections and is versatile in its use due to its compact and simple design. These and other modifications may be made without departing from the spirit of the invention which is intended to be limited solely by the appended claims.

What is claimed is:
1. Apparatus for distributing flowing media from one flow cross section to another different flow cross section comprising:
   a. a tubular enclosure flared in funnel fashion and open at both ends providing a smaller and a wider opening;
   b. at least one plate having a multiplicity of parallel passage canals therethrough supported within the tubular enclosure perpendicular to the axis of the tubular enclosure with passage openings having a flow resistance less than said parallel passage canals provided along substantially the entire rim of the plate between said plate and the tubular enclosure, said plate having a thickness which decreases toward its rim; and
   c. an end plate having a multiplicity of parallel passage canals filling the wider opening of the tubular enclosure.

2. Apparatus according to claim 1, wherein several plates are supported within said enclosure one behind the other in the direction of the axis of the tubular enclosure with mutual spacing, each having lateral openings between the rim of the plate and the tubular enclosure.

3. Apparatus according to claim 2, wherein the base areas of said plates which follow each other in the direction of the flare of the tubular enclosure increase in said direction.

4. Apparatus according to claim 3, the sum of the area of the passage openings between the rim of the plate and the tubular enclosure for each plate is smaller than the cross section area of the smaller opening of the tubular enclosure.

5. Apparatus according to claim 4, wherein two plates are provided following one another in the direction of the flare of the tubular enclosure and wherein the sum of the area of the passage openings between the rim of the plate and the tubular enclosure is smaller for the succeeding plate than for the preceding plate.

6. Apparatus according to claim 1 wherein said at least one plate is fastened in a tube section which is inserted into the tubular enclosure, and the passage openings between the rim of the plate and the tubular enclosure are formed by slots in the wall of said tube section.

7. Apparatus according to claim 1, in combination with a reaction chamber filled with a catalyst, said apparatus being used as a distributor for a mixture of gases to be reacted with each other, with said smaller opening coupled to a small feed line and said wider opening to said reaction chamber of larger cross section.

8. Apparatus according to claim 1 wherein said wider opening is coupled to an input pipe of a first cross section and said smaller opening to an outlet pipe of smaller cross section, said apparatus thereby acting as a collector.

* * * * *